US012226781B2

(12) United States Patent
Schie

(10) Patent No.: US 12,226,781 B2
(45) **Date of Patent: *Feb. 18, 2025**

(54) FLYWHEEL FOR A WOOD CHIPPER AND PROCESS FOR MAKING THEREOF

(71) Applicant: Kurt M. Schie, Akron, NY (US)

(72) Inventor: Kurt M. Schie, Akron, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,184

(22) Filed: May 16, 2023

(65) Prior Publication Data

US 2023/0372947 A1 Nov. 23, 2023

Related U.S. Application Data

(63) Continuation of application No. 17/746,468, filed on May 17, 2022, now Pat. No. 11,691,158.

(51) Int. Cl.

| | |
|---|---|
| ***B02C 18/08*** | (2006.01) |
| ***B02C 18/14*** | (2006.01) |
| ***B02C 18/16*** | (2006.01) |
| ***B02C 18/18*** | (2006.01) |
| ***B02C 18/24*** | (2006.01) |
| ***B27L 11/00*** | (2006.01) |
| ***B27L 11/02*** | (2006.01) |

(52) U.S. Cl.
CPC .......... *B02C 18/083* (2013.01); *B02C 18/143* (2013.01); *B02C 18/24* (2013.01); *B27L 11/02* (2013.01); *B02C 2018/166* (2013.01)

(58) Field of Classification Search
CPC ..... B02C 18/083; B02C 18/24; B02C 18/142; B02C 18/166
See application file for complete search history.

(56) References Cited

U.S. PATENT DOCUMENTS

| | | | | |
|---|---|---|---|---|
| 5,897,066 A * | 4/1999 | Bacon | B29B 17/04 241/300 |
| 6,910,648 B1 * | 6/2005 | Reinhold | B02C 18/18 241/101.78 |
| 2011/0100511 A1 * | 5/2011 | Robinson | B27L 11/005 144/373 |

OTHER PUBLICATIONS

Tips-for-laser-cutting, retrieved date Nov. 5, 2023. https://www.komaspec.com/about-US/blog/5-key-design-tips-for-laser-cutting-dfm/.*

* cited by examiner

*Primary Examiner* — Mohammed S. Alawadi
(74) *Attorney, Agent, or Firm* — James C. Simmons; Steven M. McHugh; Cantor Colburn LLP

(57) ABSTRACT

A wood chipper, a flywheel therefor, and a process of making the flywheel. A plurality of plates are laser cut to each have a thickness up to about ⅜ inch, including laser cutting a plurality of apertures in each of the plates and laser cutting a central opening in each of the plates for receiving a shaft for effecting rotation of the flywheel. The plurality of plates are laminated together by inserting fasteners in corresponding ones of the apertures in the plates. At least one knife is attached to the laminated plates for cutting wood material to form chips of the wood material as the flywheel is rotated.

12 Claims, 12 Drawing Sheets

FLYWHEEL FOR A WOOD CHIPPER AND PROCESS FOR MAKING THEREOF

This is a continuation of application Ser. No. 17/746,468, filed May 17, 2022, which application is hereby incorporated herein by reference.

The present invention relates generally to wood chippers. More particularly, the present invention relates to a flywheel for chipping wood in a wood chipper and to a method for making the flywheel. The present invention also relates to means for feeding wood product down an in-feed bin of a wood chipper to a chipping flywheel.

My U.S. Pat. No. 10,507,469, which is incorporated herein by reference, discloses a wood chipper in which wood to be chipped is fed between two rollers wherein one of the rollers is driven and has cutting elements thereon for grasping wood branches or the like by pinching the wood material between a blade on a roller and another roller, allowing the rotation of the rollers to advance the branches into a chamber. A heavy steel flywheel in the form of a circular disc having opposite surfaces, is rotatably received in the chamber for chipping the wood into fine chips, which are then discharged from the chamber into a chute for passage out of the wood chipper. The proximate surface (as the wood pieces enter the chamber) of the flywheel has attached thereto with bolts (or other suitable fasteners) at least one but preferably two or four elongate radially positioned knives circumferentially generally equally spaced about the flywheel surface for cutting the wood pieces into chips. Associated with each knife is a radial slot which extends through the flywheel for routing the chips to the other side thereof. For each knife or slot, an elongate radial fan blade or fin or deflector is welded to the distal surface to direct the chips passing through the respective slot to the chute for passage out of the wood chipper. Other examples of wood chippers are found in U.S. Pat. No. 7,878,434 and in Canadian patent documents 3019727 and 3050946, which are also incorporated herein by reference.

Some chippers are known which may use just a single in-feed roller, wherein the wood material is pinched between the blades of the single roller and the base of the in-feed bin and advanced into the chamber to be chipped by the rotating flywheel.

Other wood chippers are known which do not have any in-feed rollers and rely instead on gravity due to the slope of the in-feed bin for advancing the wood product into the chipping chamber. Since the wood product in such chippers is not being forced into the chipping chamber, it is considered desirable to make the cutting thereof more effective. In order to make the cutting more effective, gravity-fed chippers are known which utilize a rectangular non-rotatable flat square edge anvil that is stationery and acts as a lower cutting edge that comes together with a flywheel knife, like the blades of a pair of scissors, so effectively as to shear the wood material clean off. Such an anvil, which is illustrated at 230 in FIGS. 6 and 7 of the drawings, is located between the wood product outlet of the inlet bin and the flywheel and slopes at generally the same angle as the in-feed bin slopes. With such a rectangular anvil, the flywheel knives very effectively cut completely through the wood pieces.

However, the shearing of the wood material clean off by use of such an anvil 230 releases the trailing wood material from the inward pull of the rotating flywheel. It is considered desirable that the flywheel knives cut the wood pieces in gravity-fed chippers less effectively to leave the leading and trailing pieces slightly attached so that the leading mostly cut-off pieces can successively "pull" the trailing pieces into the flywheel.

It is accordingly an object of the present invention to provide a gravity-fed wood chipper wherein the wood product can be cut in a manner so that trailing wood pieces can be successively pulled into the flywheel for more effective chipping.

In accordance with an aspect of the present invention, in order to provide such a gravity-fed wood chipper for more effective chipping, a cylindrical anvil, against which cutting by the flywheel knife or knives acts, is disposed between the outlet of the inlet chute and the flywheel so that the wood material is movable from the chute outlet over the cylindrical anvil to the flywheel.

U.S. Pat. No. 5,636,509, which is also incorporated herein by reference, discloses a flywheel engine wherein the flywheel is made of many laminations. U.S. Pat. Nos. 5,282,356, 5,381,970, 5,385,308, 5,390,865, 5,636,509, and 6,910,648, which are also incorporated herein by reference, may also be of interest.

The flywheel must be heavy enough to achieve the desired effectiveness, which translates, for a particular diameter, that it be thick enough, and the required thickness increases as the horsepower increases. For a typical steel flywheel diameter of 24 inches, the flywheel thickness for a small 15 horsepower wood chipper is desirably about ¾ inch, and the flywheel thickness for a 60 horsepower wood chipper is desirably about 1½ inches. Thus, it may be said in general that the flywheel thickness in typical wood chippers (those of 15 horsepower or more) should be about ¾ inch or larger.

Heretofore, flywheels have been machined. Flywheel machining of a thick piece such as ¾ inch thickness by laser cutting is a slow process which generates heat and warpage, which thereafter requires expensive flattening, with the undesirable result being that the machining process for such a thick flywheel is an expensive and time-consuming process. Moreover, it is difficult to make the desired small clean holes in the flywheel to receive bolts.

It is accordingly another object of the present invention to provide a wood chipper flywheel which can be made by a less expensive and quicker process.

In accordance with another aspect of the present invention, in order to provide a wood chipper flywheel which can be made by a less expensive and quicker process, a plurality of plates are formed and laminated together with fasteners, a central opening is provided in the flywheel for receiving a shaft for effecting rotation of the flywheel, and at least one cutter is attached to the flywheel on one side thereof for cutting wood to form chips of the wood as the flywheel is rotated.

The above and other objects, features, and advantages of the present invention will be apparent in the following detailed description of the preferred embodiment(s) when read in conjunction with the appended drawings in which the same reference numerals depict the same or similar parts throughout the several views.

DETAILED DESCRIPTION OF THE PREFERRED EMBODIMENT(S)

Figure 1:
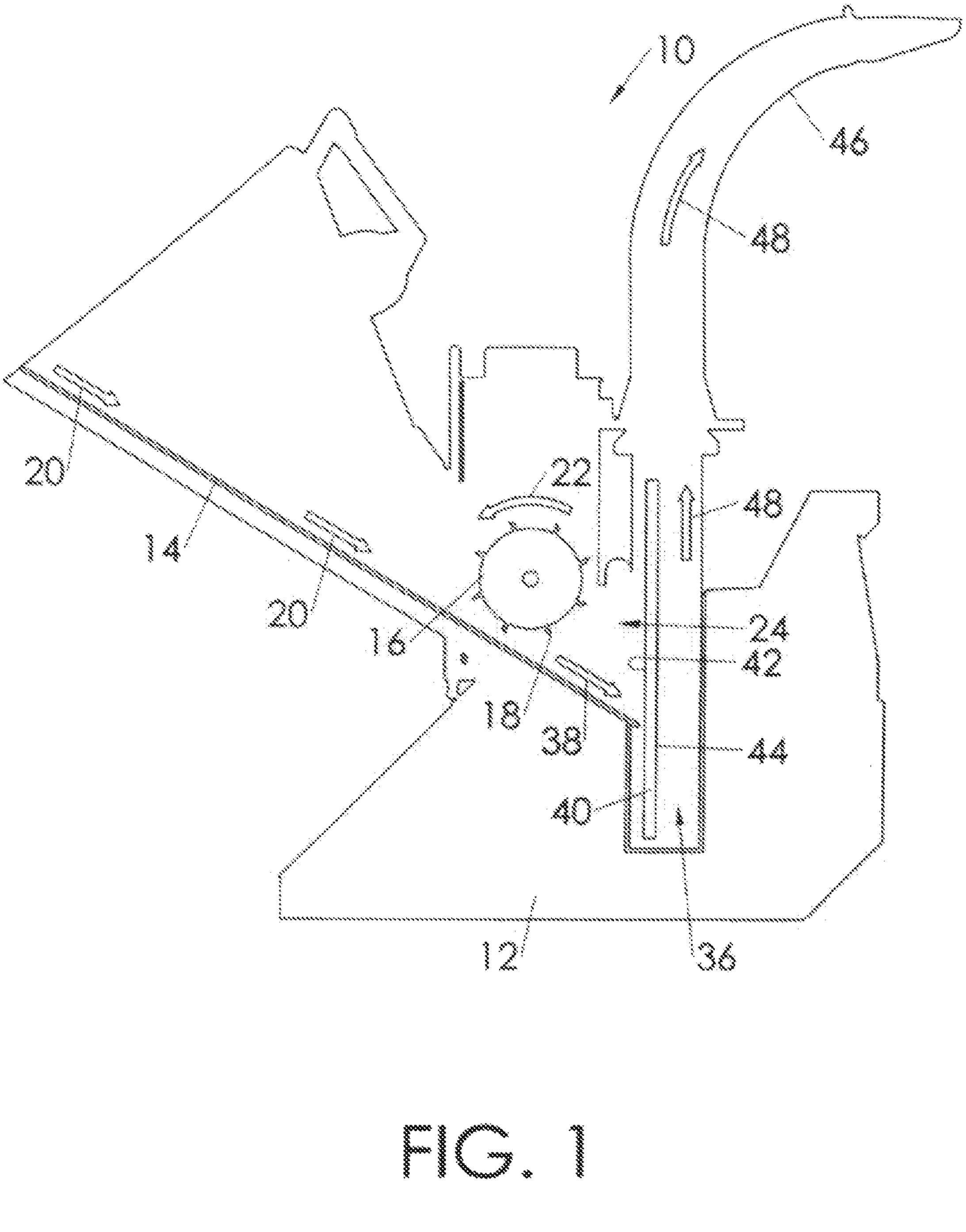
FIG. 1 is a schematic view of a wood chipper which embodies the present invention, showing schematically an in-feed roller and a flywheel and the path of wood product through the wood chipper.

Referring to FIG. 1, there is shown schematically generally at 10 a wood chipper which includes a housing 12, an inlet chute 14, a powered or driven in-feed roller 16 (shown schematically) having cutting knives 18 (teeth) for receiving a wood product such as brush, tree branches, and the like passing along the inlet chute 14. The wood material is grasped by pinching it between blades 62 on the ends of the knives 18 and the base of the in-feed bin 14, thereby causing the blades 62 to bite into the wood product and allowing the rotation of the roller to advance the wood material through an inlet opening, illustrated at 24, into a chipping chamber, illustrated at 36, as illustrated at 38. When the term is used herein and in the claims with reference to the roller 16, a knife is defined herein and in the claims as an instrument for effecting the grasping and pinching of wood product between a blade on the end of the knife and an object such as another roller (as discussed hereinafter) or an in-feed bin. It should be understood, however, that the chipper 10 may not have an in-feed roller at all and rely instead on gravity due to the slope of the in-feed bin.

The in-feed roller 16, which rotates counterclockwise as illustrated at 22 and which is driven as shown and discussed in my aforesaid U.S. Pat. No. 10,507,469, may alternatively be paired with a second driven or non-driven in-feed roller for passage of wood between the pair of in-feed rollers, as also shown and discussed in my aforesaid U.S. Pat. No. 10,507,469, which is incorporated herein by reference.

In the chipping chamber 36, a flywheel, illustrated schematically at 40 in FIG. 1, having knives on its proximate surface 42, rotates to effect chipping of the wood portions into smaller pieces which may be called chips, and the chips are passed through slots in the flywheel 40 and out to the distal side 44 of the flywheel 40, where the chips are suitably routed by paddles or fins to exit through an exit chute 46, as illustrated at 48. The details of the flywheel 40 including its knives, slots, and paddles will be discussed in greater detail hereinafter. My aforesaid U.S. Pat. No. 10,507,469, which is incorporated herein by reference, discusses a wood chipper and the functioning thereof in greater detail.

Figure 2:
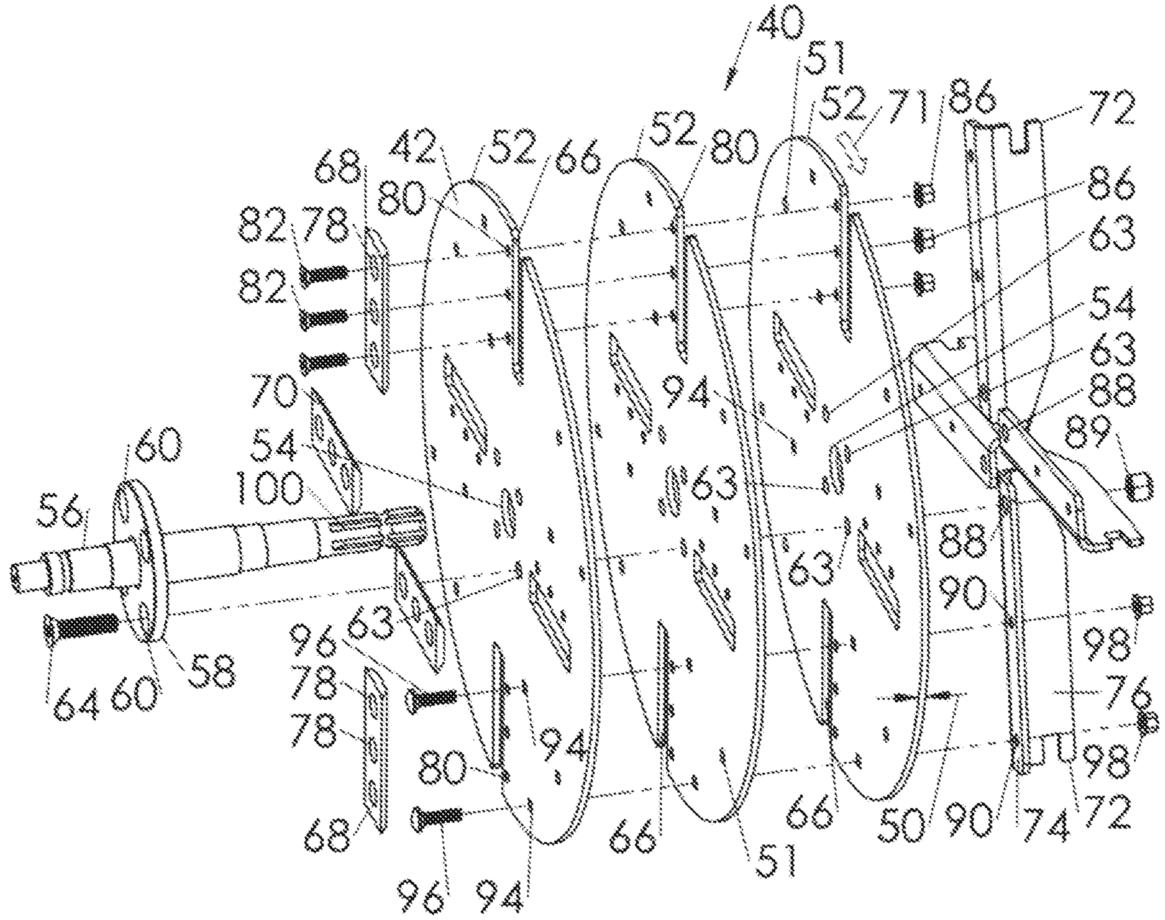
FIG. 2 is an exploded view of the flywheel.
Figure 3:
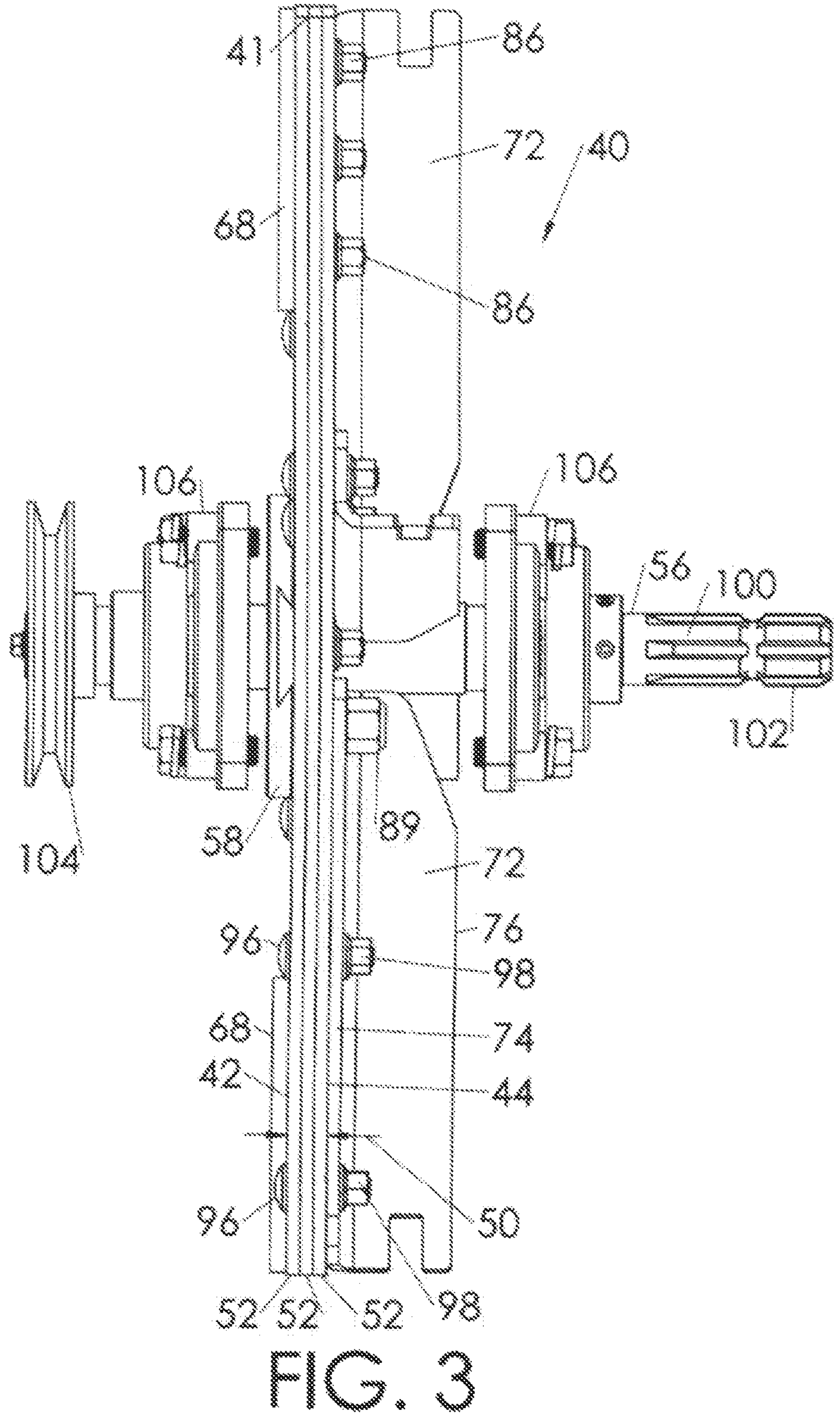
FIG. 3 is a side view of the flywheel.

Referring to FIGS. 2 and 3, the flywheel 40 is circular and composed of steel, the type of steel being, for example, A36 carbon steel. It has a diameter of, for example, 24 inches and a thickness, illustrated at 50 (exclusive of hereinafter discussed knives and paddles and the like attached thereto), of, for example, 1⅛ inch, to provide a suitable weight for a 20 horsepower wood chipper (which, as discussed hereinafter, is the flywheel embodiment illustrated in the drawings). The flywheel 40 may have other thicknesses generally related to the desired horsepower. For example, it may have a thickness 50 of ¾ inch suitable for a 15 horsepower wood chipper. For another example, it may have a thickness 50 of 1½ inch suitable for a 60 horsepower wood chipper.

The conventionally used method of flywheel machining of such thick steel pieces by laser cutting undesirably generates heat and warpage, which thereafter requires expensive flattening, with the undesirable result being that the machining process for such a thick flywheel is an expensive and time-consuming process. Moreover, it is difficult to make the desired small clean holes in such a thick steel piece to receive bolts. It is very difficult to laser cut holes having diameters which are less than the plate thickness. I have found that steel plates having a thickness less than or about ⅜ inch may be laser cut so as to desirably not generate such heat and warpage as to require flattening and to desirably obtain small clean holes. As long as a hole diameter is greater than the plate thickness, such a small clean hole is obtainable by laser cutting. Accordingly, in order to provide a wood chipper steel flywheel such as flywheel 40 having an overall thickness greater than about ⅜ inch which can be made by a less expensive and quicker process not requiring such flattening, in accordance with the present invention, a plurality of plates 52, at least one of which and preferably all of which have a thickness of about ⅜ inch or less (which is considered to be about the largest thickness which will still laser cut well) are formed by laser cutting and laminated together with fasteners, as discussed hereinafter. As used herein and in the claims, the term "laminate" is defined as attaching a plurality of side-by-side thin plates together to provide a thicker member, and when such a member is so formed, it is referred to as being "laminated." Thus, the laminated flywheel 40 as seen in FIGS. 2 and 3 is composed of three plates 52 each having a thickness, illustrated at 55, of, for example, about ⅜ inch, which are attached or laminated together side-by-side as seen in FIG. 3 to provide the thicker laminated flywheel 40. While the three plates are shown to have the same thickness and the same diameter, it should be understood that the thickness for each of the plates may be different and the diameters may vary as long as the laminated flywheel is suitable for use. For a 15 horsepower wood chipper, two ⅜ inch plates laminated together are considered sufficient. A 60 horsepower wood chipper would require four ⅜ inch plates laminated together. At 41 in FIG. 3 are radius corners (shown as tangent edges) for safer and easier handling of the steel plates.

It should of course be understood that a larger number of thinner plates such as, for example, ¼ inch or ⅛ inch, may be used to form the laminated flywheel of the desired thickness. However, there may be no manufacturing benefit to doing so since a laser can, as a practical matter, only cut a hole in a plate which has a diameter which is about equal to or greater than the plate thickness, and there would not normally be a need for a hole diameter smaller than ⅜ inch in the flywheel. For example, a ⅜ inch thick plate allows for a ⅜ inch (or larger) hole to be laser cut which may normally be an adequate for the flywheel, and a ¼ inch plate allows for a ¼ inch (or larger) hole to be laser cut, etc., but the flywheel would not normally need such a small hole. Therefore, there would not normally be a need to cut a greater number of thinner plates of steel to provide the needed flywheel thickness, rather there would undesirably be additional labor and laser cutting costs. If there is a need for smaller diameter holes in the plates, then the plates should be made thinner to match the smaller hole size. Accordingly, unless a hole is needed in a plate which has a smaller diameter which cannot be practically laser cut in a ⅜ inch thick plate, it is preferred that the plate thickness be about ⅜ inch.

The individual plates 52 are formed to have various apertures and slots as hereinafter discussed which define corresponding composite apertures and slots in the laminated flywheel 40. For purposes of clarity, a group of three aligned apertures or slots in the three plates 52 respectively and the composite aperture or slot defined thereby in the laminated flywheel will have the same reference numeral, and also for purposes of clarity, only representative bolts and nuts for the apertures are shown, and it should be understood that similarly positioned apertures will similarly have similar bolts and nuts. It should be understood that the plates 52 are formed substantially similarly, i.e., formed to have the same apertures and slots similarly situated, but that would not prevent, for example, a plate having an aperture that the other plates do not have or, for another example, a plate having a different diameter which would not interfere with the lamination of the plates together. It should also be understood that any dimensions, aperture diameters, sizes or types of bolts or the like specified herein are for exemplary purposes only and not for purposes of limitation, unless otherwise specified. In accordance with the above-discussed preferred embodiment, for example, each of the plates has a diameter of 24 inches, and each of the apertures in the plates has a diameter of ⅜ inch or larger.

A suitable plurality of, for example, four circumferentially spaced slots 66 are provided in the flywheel 40 to extend through the entire thickness of the flywheel 40 for the passage of chips formed by knives 68 next to the slots respectively on the proximate side 42 of the flywheel, as hereinafter discussed. For more effective chipping, these slots 66 (and accordingly the knives 68) are preferably staggered radially. Thus, two of these slots 66, which are diametrically opposed, are seen to extend radially inwardly from the outer edge of the flywheel 40, while the other two of these slots 66 are seen to be radially closer to the center 54 thereby providing a radially staggered relationship to the four slots 66.

An elongate radially extending knife 68 is attached to the proximate side 42 (which faces the wood inlet 24) of the flywheel adjacent each of the slots 66 thereby lying alongside the respective slot and has a cutting blade 70 on it's leading edge (the flywheel 40 rotates in the direction illustrated at 71) to chip or cut the pieces of wood fed into the chipping chamber 36 into fine chips. The blades 70 are positioned in accordance with principles commonly known to those of ordinary skill in the art to which the present invention pertains so that the chips as they are formed are suitably led through the slots 66 respectively.

Each knife 68 has a plurality of, for example, three longitudinally spaced apertures 78, and the flywheel 40 has corresponding apertures 80. Suitable screws or bolts 82 (for example, ⅜ inch flat head screws) are received in the apertures 78 and the corresponding apertures 80 respectively with the plates 52 pressed together and suitable nuts 86 tightly applied thereto to form the rigid laminated flywheel 40 with the knives 68 tightly and rigidly attached to the proximate side 42 thereof.

An elongate radial fan blade or fin or paddle or chip deflector 72 is attached to the distal side 44 of the flywheel suitably adjacent each of the slots 66 thereby lying alongside the respective slot. The paddle 72 has an attachment portion 74 to lie flat against the flywheel 40 for attachment thereto and a deflector portion 76 to act to deflect the chips passing through the respective slot to exit the wood chipper 10 through the exit chute 46, as illustrated at 48. The paddles 72 are shaped and positioned in accordance with principles commonly known to those of ordinary skill in the art to which the present invention pertains to suitably direct the chips to the exit chute 46.

Each paddle 72 has an inner aperture 88 in its attachment portion adjacent the radially inner end thereof. Each paddle 72 has a plurality of, for example, three longitudinally spaced apertures in its attachment portion 74 with one of these apertures being inner aperture 88 and with the other two of these apertures being identified with reference numeral 90. The flywheel apertures 62 correspond to the paddle inner apertures 88 respectively, and flywheel apertures 94 correspond to the other paddle apertures 90 respectively. Suitable screws or bolts 96 (for example, ⅜ inch carriage bolts) are received in the other paddle apertures 90 and the corresponding flywheel apertures 94 respectively and suitable nuts 98 tightly applied thereto to rigidly attach the paddles 72 tightly and rigidly to the distal side 44 of the flywheel 40.

A hole 51 (extending entirely through the thickness of the flywheel 40) is desirably provided in each quadrant of the flywheel 40. A pin is insertable in a suitable one of the holes 51 and in a hole in the chipper frame to restrain movement of the flywheel for safely conducting repairs and maintenance.

The flywheel 40 has a central aperture 54 in which a suitably powered rotatable shaft or rotor 56 is received for supplying rotating power to the flywheel 40. The shaft or rotor 56 has a mounting flange 58, integral therewith or otherwise suitably rigidly attached thereto, which has four circumferentially spaced apertures 60. The flywheel 40 has four corresponding apertures 62, and screws or bolts 64 (for example, ⅝ inch flat head screws) are received in apertures 60 and apertures 62 respectively and in the paddle radially inner apertures 88 respectively and nuts 89 tightly applied for rigidly attaching the flange 58 to the flywheel 40 so that rotation of the shaft 56 will suitably rotate the flywheel 40.

It should be understood that the plates 52 and the knifes 68 and paddles 72 may be assembled in other ways, for example, by welding the knifes 68 and/or the paddles 72 to the flywheel 40, or, for another example, as illustrated in claims 4, 5, 11, and 12. Such other ways are meant to come within the bounds of the present invention as defined by the appended claims.

The shaft 56 has an end portion 100 suitably adapted with splines 102 for attachment to the power take-off of a tractor or the like, or the shaft may be suitably alternatively adapted for attachment to an engine incorporated with the wood chipper or for otherwise provision of suitable power to the shaft 56. The other end of the shaft 56 is suitably connected to a pulley 104 for driving a hydrostatic pump for the in-feed roller 16 or for otherwise suitably driving the in-feed roller 16. Suitable conventional bearings 106 are suitably provided for bearing the shaft 56. There may be alternative suitable arrangements for driving the flywheel 40 and in-feed roller 16.

Skewed Knives

Figure 4:
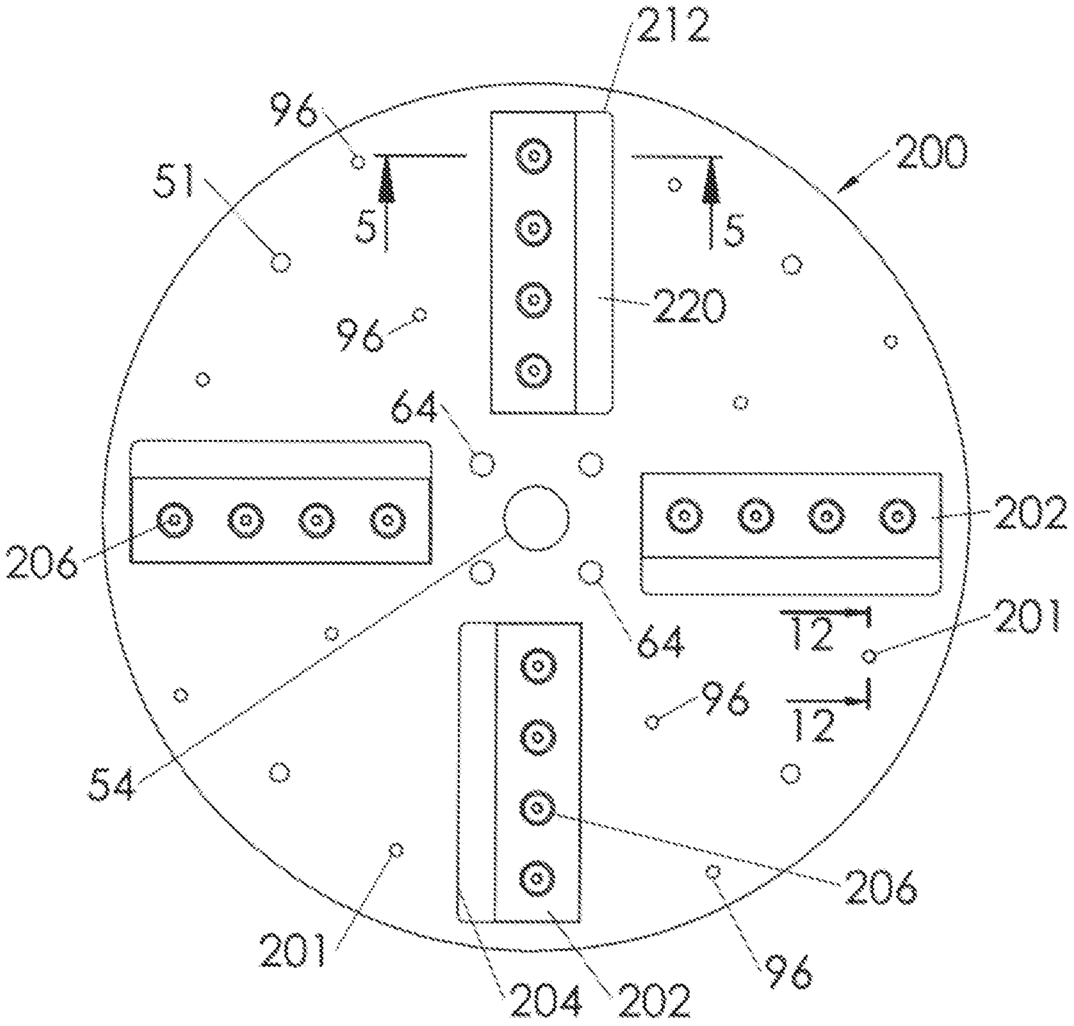
FIG. 4 is a plan view of the chipping side of an alternative embodiment of the flywheel.
Figure 5:
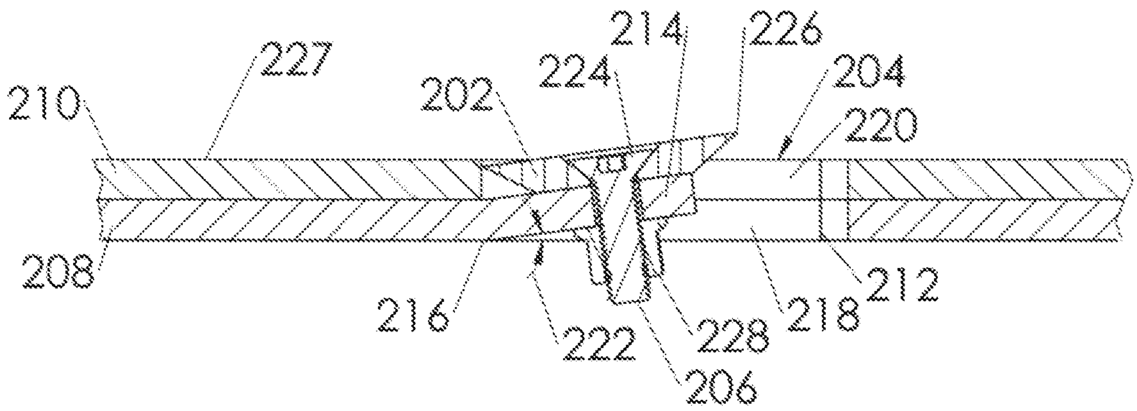
FIG. 5 is a section view of the alternative flywheel, taken along lines 5-5 of FIG. 4.

Referring to FIGS. 4 and 5, there is shown generally at 200 a flywheel having four circumferentially spaced knives 202 each arranged adjacent to an opening 204 for passage of chips (cut by the knives) through the thickness of the flywheel 200, similarly as done for the flywheel 40 of FIGS. 2 and 3. Unlike the flywheel of FIGS. 2 and 3, none of the passages 204 in this embodiment extend to the circumferential edge of the flywheel and the four knives 202 are not radially staggered. Instead of three fasteners, the knives of FIGS. 4 and 5 are seen to be attached with four fasteners 206. Instead of the three plates as in FIGS. 2 and 3 (or more than 3 plates), the flywheel 200 of FIGS. 4 and 5 is seen to have two plates 208 and 210. However, as discussed hereinafter with respect to FIGS. 11 and 12, the flywheel 200, in accordance with an alternative embodiment thereof, has three or more plates. Curvatures or roundedness of corners of the slots 204 (as well as individual plate slots 218 and 220) are indicated at 212.

Referring to FIG. 5, the flywheel inner plate 210 (which faces the chipping chamber inlet 24 and defines the proximate side 42 of the flywheel) and the outer plate 208 have aligned slots 220 and 218 respectively. A tab 214 of the outer plate 208 extends from the beginning of the slot 218 at 216 partially toward the other end of the slot 218 and is bent or otherwise suitably formed to be skewed inwardly (toward the chipping chamber inlet 24) so as to lie partially within the inner slot 220, as seen in FIG. 5, at a small angle, illustrated at 222. The knife 202 is suitably attached to the tab 214 such as by the fasteners 206 each comprising a bolt having a head 224 which is sunk into a cavity of the knife 202 so that the bolt head 224 does not interfere with chipping by the knife blade 226. The bolt shank is received in an aperture in the outer plate 208, and a nut 228 is suitably applied. Since the knife is laid flat to the tab 214, it is also skewed at the angle 222 so that the knife blade 226 is located inwardly beyond the surface 227 of the inner plate 210, in a good position for aggressively chipping wood being gravity fed into the chipping chamber opening 24. The more aggressive chipping afforded by this position of the knife blade 226 advantageously better advances the wood material. As the angle 222 is increased, the chipping becomes more aggressive, but if the angle 222 is too large, it may lose its effectiveness and have the contrary result of bogging down the chipping process. Therefore, in order to maximize aggressiveness without risking the bogging down of the chipping process, it has been found that the angle 222 should desirably be between about 5 and 10 degrees, preferably about 7 to 8 degrees. The aligned slots 219 and 220 are provided to suitably allow the passage of the chips cut by the blade 226 to pass through the thickness of the flywheel 200 (i.e., downwardly as seen in FIG. 5) where the paddles (not seen in this embodiment but similar to the paddles 72) direct the chips from the chipper.

The radially spaced fasteners 96 and 64 in each quadrant of the flywheel 200 are received in suitable apertures in the plates 208 and 210 to attach the paddles (not shown) to the flywheel 200, similarly as the paddles 72 are attached to flywheel 40 in FIGS. 2 and 3. The paddles for either of the flywheels 40 or 200 may be otherwise suitably attached and positioned.

It can be seen in FIG. 2 that the bolts 82 and nuts 86 for flywheel 40 serve to hold the plates together as well as hold the knives 68 to the plates. However, as seen in FIG. 5, the bolts 224 that hold the knives 202 to the flywheel 200 do not help to hold the plates 208 and 210 together. To insure that the plates 208 and 210 are held together with sufficient strength, a suitable number (for example, one in each quadrant of the flywheel) of bolts or screws 201 attach the two plates 208 and 210 (or three or more plates). The attachment of the plates with such bolts 201 will be described hereinafter with respect to the three-plate embodiment of FIG. 12, and the attachment of the two plates 208 and 210 with the bolts 201 is similar, except that the bolts 201 for the two-plate embodiment of FIG. 5 are sized lengthwise as necessary to accommodate the thickness of the two plates of FIG. 5 rather than the thickness of the three plates of FIG. 12.

Figure 11:
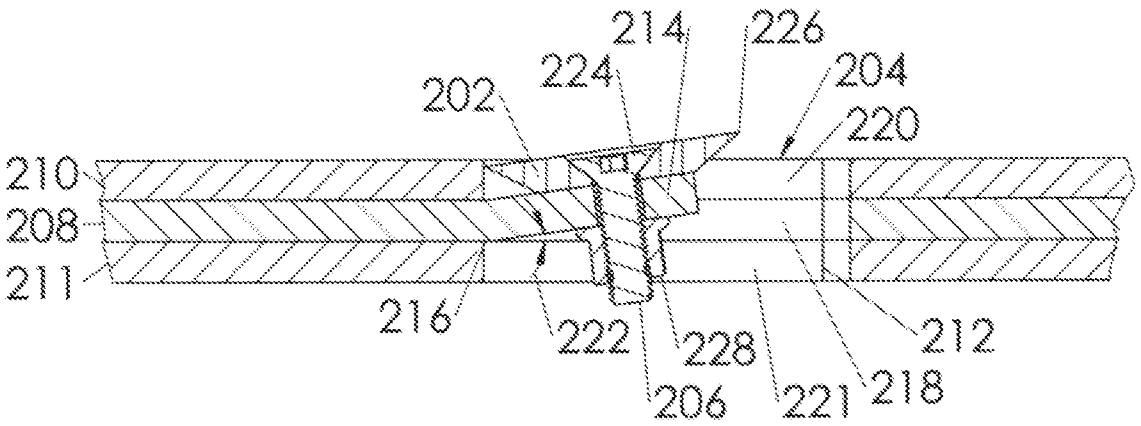
FIG. 11 is a sectional view similar to that of FIG. 5, taken along lines 5-5 of FIG. 4, showing an alternative embodiment of the flywheel of FIG. 5, wherein this alternative flywheel has three plates.

Referring to FIG. 11, there is shown an alternative embodiment of the flywheel 200 wherein it is shown to be composed of three plates, i.e., the plates 208 and 210 and an outermost plate 211 defining the chip passage which includes the aligned slots 218, 220, and 221 respectively. The outermost plate 211 is seen to be formed similarly as the inner plate 210. It should be understood that the flywheel 200 may have additional plates outwardly of plate 208 and similarly formed as plates 210 and 211.

Figure 12:
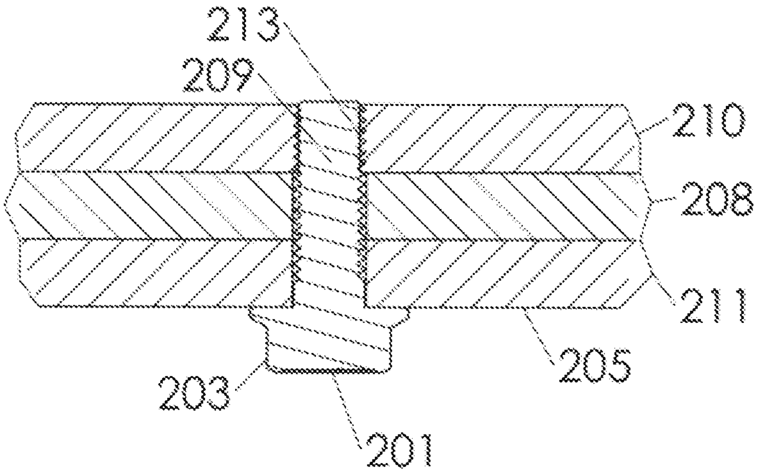
FIG. 12 is a sectional view taken along lines 12-12 of FIG. 4 of each or the alternative flywheel embodiments of FIGS. 5 and 11.

Referring to FIG. 12, the bolt or screw 201 is seen to have a head 203 which engages the outer surface 205 (plate 211) of the flywheel 200 and a threaded shank 207 which extends through aligned apertures in the three plates. Its end portion 209 threadedly engages the threaded aperture 213 (the apertures in the other two plates shown to be unthreaded). It should be understood that the plates of the flywheel 200 (as well as the flywheel 40) may be otherwise suitably attached.

Figure 6:
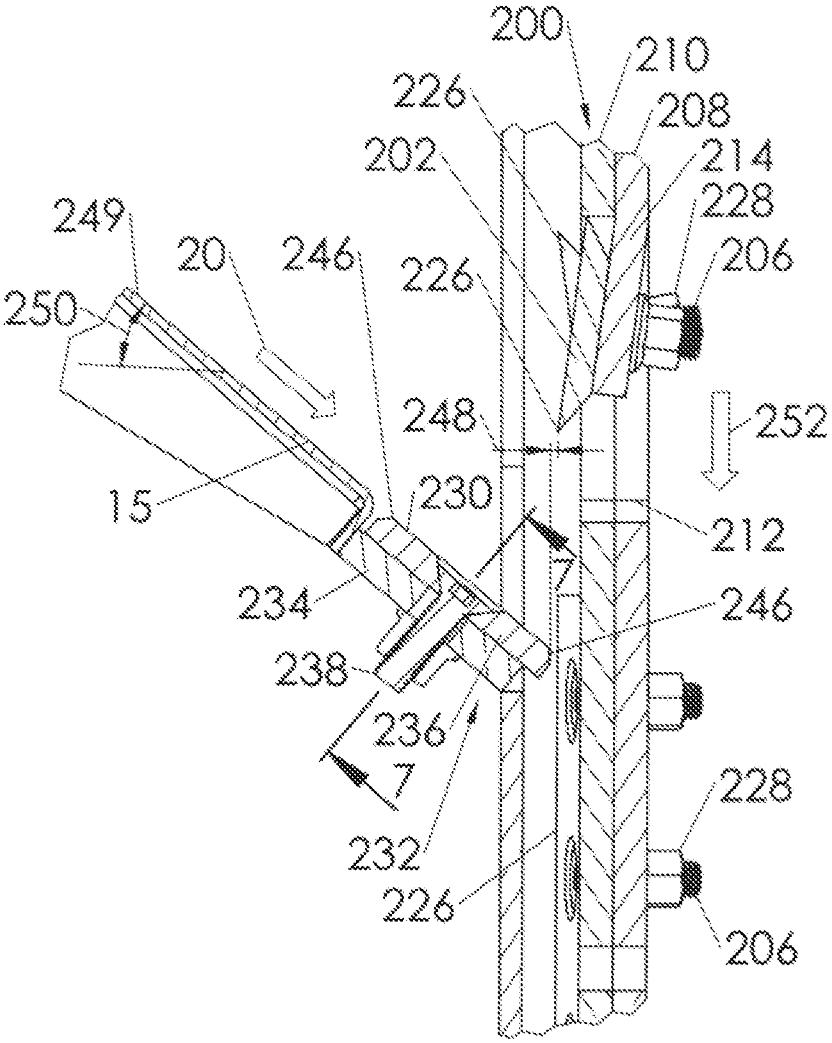
FIG. 6 is a section view of a portion of an alternative embodiment of the wood chipper, showing the alternative embodiment of the flywheel and a bed knife anvil (bed knife anvil is prior art) for delivering wood product to the alternative flywheel.
Figure 7:
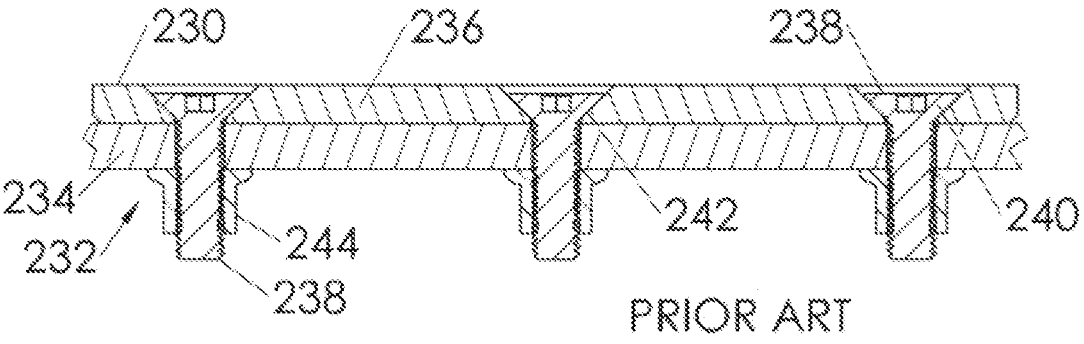
FIG. 7 is a longitudinal section view, taken along lines 7-7 of FIG. 6, of the prior art bed knife anvil.

Referring to FIG. 6, there is shown the flywheel 200 with the knives 202 attached to the tabs 214, as in FIGS. 4 and 5. As seen in FIGS. 6 and 7, there are no in-feed rollers in this embodiment, but instead, a rectangular inclined surface 230 of what is referred to as a bed knife anvil 232 (which is well known in the art) is provided between the end of the similarly inclined inlet chute or bin 15 for gravity feed of the wood product down the inlet chute 15 to an outlet thereof, then over the inclined surface 230, and into the chipping chamber 36 where it is chipped by knives 202. The incline of both the anvil surface 230 and the inlet chute surface 249 should be steep enough to allow the wood product to be easily movable by gravity toward the chipping chamber inlet but not so steep that the chute opening is too high for easily loading the wood product. Thus, it has been found that the angle of incline, illustrated at 250, is desirably between about 30 and 40 degrees, preferably about 40 degrees. Such a bed knife anvil 232 is well known in the art, and comprises a support member 234 to which a hardened steel anvil member 236 is suitably attached such as by three spaced bolts 238 (or other suitable number such as four or five spaced bolts) whose heads 240 are suitably inset into cavities 242 in member 236 so as to not interfere with passage of wood product along the surface 230, and suitable nuts 244 applied. The rectangular anvil 236 is suitably chamfered, as illustrated at 246, along each of its sides and is positioned relative to the blades 226 (as they pass by, the flywheel 200 spinning in the direction illustrated at 252) a distance illustrated by gap 248. This gap 248, if suitably sized, allows the shearing of the wood material between the blades 226 and the near edge of the hardened steel member 236, which may be likened to shearing of the wood material by a pair of scissors. If this gap is too large, wood material may undesirably pass into the flywheel chamber without being sufficiently cut. If this gap is too small, there is of course risk of detrimental impingement by the rotating flywheel with the member 236. It has been found that this gap 248 is desirably between about 0.010 and 0.080 inch, preferably about 0.05 inch. The wood material is sheared, like cutting with a pair of scissors, between the blades 226 of the flywheel knives 202 successively and the near edge 246 of the hardened steel member 236 of the bed knife anvil. The wood material is sheared clean off, releasing it. The completely sheared off wood material to the rear is then moved forward under gravity (and/or forced forward by a powered in-feed roller, by itself or with a smooth idler roller, if the chipper has such a roller or rollers) to advance the sheared off wood material to the rear into the flywheel to be again completely sheared off and thereafter chipped by the flywheel knives 202.

Cylindrical Anvil

Figure 8:
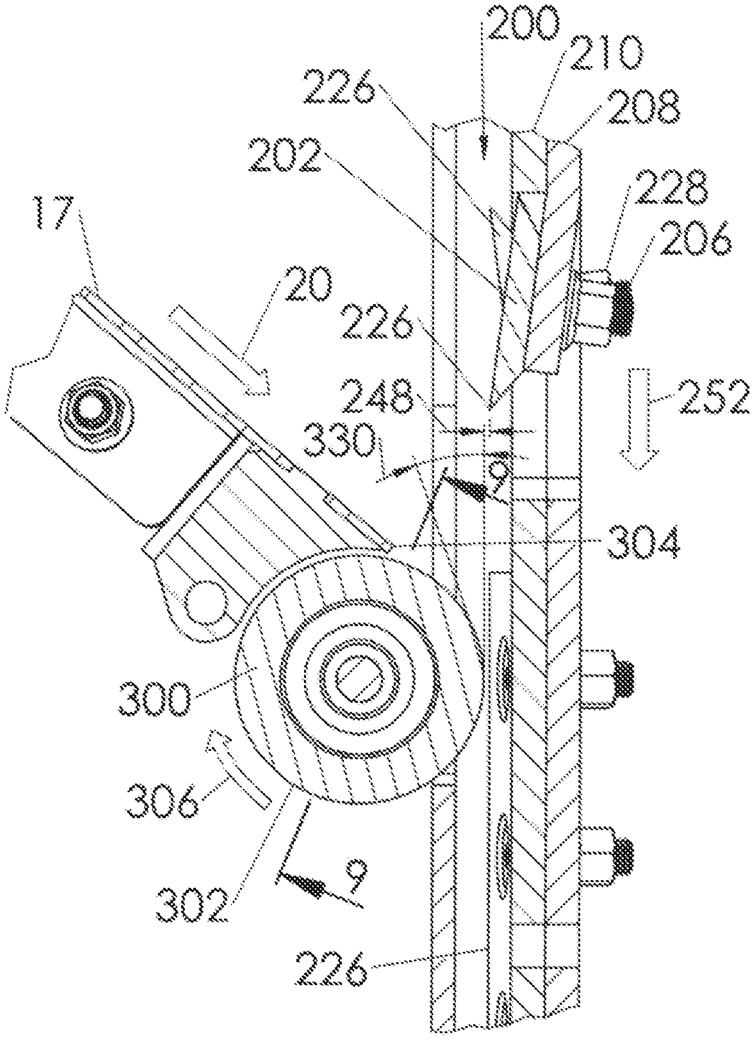
FIG. 8 is a view similar to that of FIG. 6 of a portion of another alternative embodiment of the wood chipper showing the alternative embodiment of the flywheel and further showing a roller anvil in place of the bed knife anvil.
Figure 9:
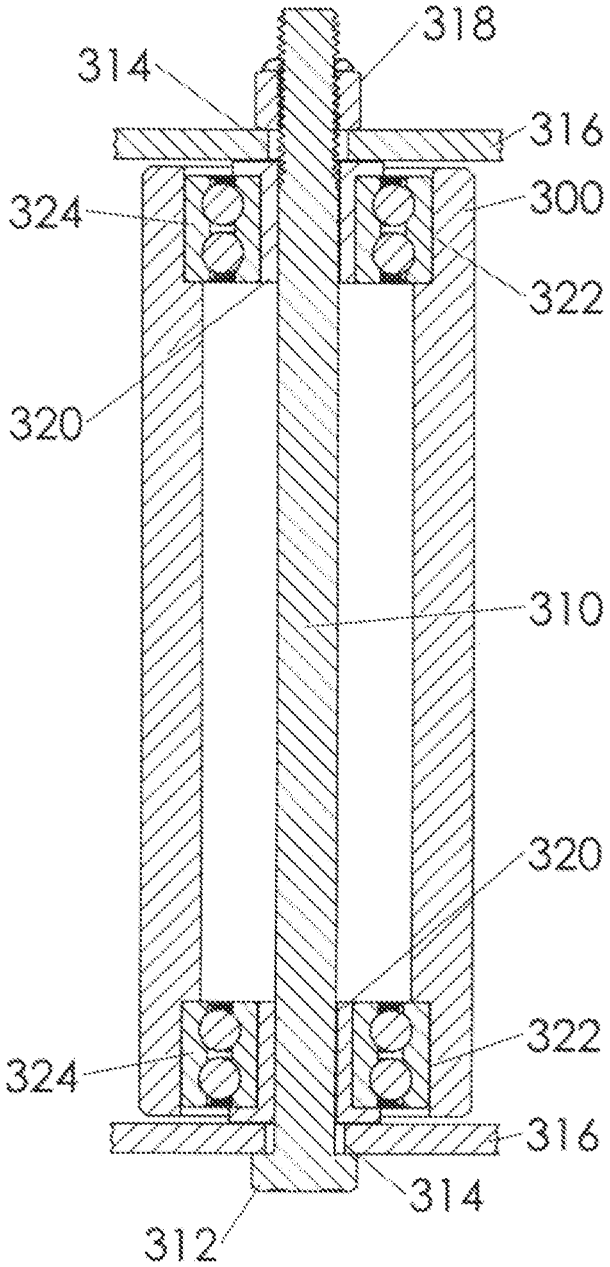
FIG. 9 is a longitudinal section view, taken along lines 9-9 of FIG. 8, of the roller anvil.

It is considered desirable for the flywheel to be able to continuously pull the wood material into the flywheel chamber during the act of chipping, to enhance the quality of the chipping process, particularly for those wood chippers without in-feed rollers wherein the wood material is gravity fed. Referring to FIGS. 8 and 9, in order to so enhance the wood chipping process, instead of the bed knife rectangular anvil 232, there is provided a cylindrical member 300, which may be called a cylindrical anvil, against which the cutting by the knives is effected. The wood chipper embodiment of FIGS. 8 and 9 is seen not to have any in-feed rollers and is thus a gravity feed chipper. The chipper with such a cylindrical anvil 300, discussed in greater detail hereinafter, is considered most effective when used for branches that are fairly straight and do not have a lot of side branches.

The cylindrical anvil 300, which may be rotatable and thus be referred to herein as a rotary anvil since it preferably is rotatable, as discussed hereinafter, is positioned to provide a circumferential anvil-like surface 302 which bridges the distance to the flywheel 200 from the end or outlet at 304 of the in-feed bin 17 along which the wood product moves under the force of gravity. The previously discussed small gap 248 separates the roller 300 from the flywheel blades 226, but is close enough to the blades 226 to allow the desired cutting, like a pair of scissors, of the wood material. The size of the small gap 248 is the same as for the embodiment of FIG. 6. In this embodiment, there are advantageously no upper or lower in-feed rollers feeding wood product to the rotary anvil 300, just gravity. As used herein and in the claims, the term "anvil" is defined as a block of iron or steel or other suitably hard material upon or against which an act of cutting is effected. Thus, in accordance with this definition, the act of cutting of wood product by the knife blades 226 is effected upon or against the cylindrical anvil 300, wherein it may be said that the blades 226 and anvil 300 act like a pair of scissors.

Instead of shearing the wood material clean off, which releases it (as the prior art bed knife anvil 232 of FIG. 6 is considered to do), without wishing to be bound by theory here or elsewhere in this specification, it is considered that the cylindrical anvil 300 (whether rotatable or not), advantageously allows the wood material to be cut mostly through as it is struck by a knife, but leaves trailing wood material to the rear of the cut to remain connected, wherein the leading portion of wood material being chipped advantageously pulls and advances a trailing portion of the wood material into the flywheel to be struck by the next knife, in a desirably continuing process of pulling the trailing wood material into the path of the cutting blades 226. Since the wood material is being substantially continuously pulled into the path of the cutting blades, the chipping process is desirably more efficient with advantageously no need for in-feed rollers.

If the cylindrical anvil 300 were not rotatable, added friction would be created by having to "drag" the wood material over the stationery anvil 300. In order to instead have the anvil 300 rotate and thus reduce the friction of movement of the wood material over the anvil 300, the cylindrical anvil 300 is preferably rotatable, as illustrated at 306, to thereby more efficiently aid in the gravity movement of the wood product after it leaves the bin 17, at 304, in a direction toward the flywheel 200.

Referring to FIG. 9, the cylindrical anvil 300, which is not powered, is shown to be rotatable, as preferred as discussed above, and is attached to the chipper by means of a suitable central elongate member or bolt 310 having a head 312 at one end and received through apertures, illustrated at 314, in a pair of spaced structural members 316 respectively of the chipper, and the bolt 310 is attached at its other end with a suitable nut 318. The bolt 310 is also received in a bushing 320 at each end, inside and adjacent the respective structural member 316. The roller 300 has an inner circumferential slot, illustrated at 322, at each end thereof. At each end, a suitable roller bearing 324 is received next to the respective bushing 320 and within the respective slot 322 to thereby allow rotation freely of the rotary anvil or roller 300. The roller 300 may have a diameter of, for example, about 2¾ inches. Examples provided herein are for exemplary purposes and not for purposes of limitation. The roller 300 may be composed, for example, of mild steel (or other material suitable for serving as an anvil) having a thickness of, for example, about ¼ inch, if desired hardened, and if desired made of stainless steel. The surface thereof may if desired be knurled for improved grip of the wood product.

The cylindrical anvil 300 is also provided to advantageously make the wood material pitch downward thereby decreasing the in-feed angle, illustrated at 330, to a steeper degree, to provide even more effective chipping. This is considered to be more particularly effective with smaller wood material on the order of one inch diameter or less.

The cylindrical anvil 300 is thus provided to achieve much improved feeding of wood material, advantageously without the need of in-feed rollers.

Water Mist

Figure 10:
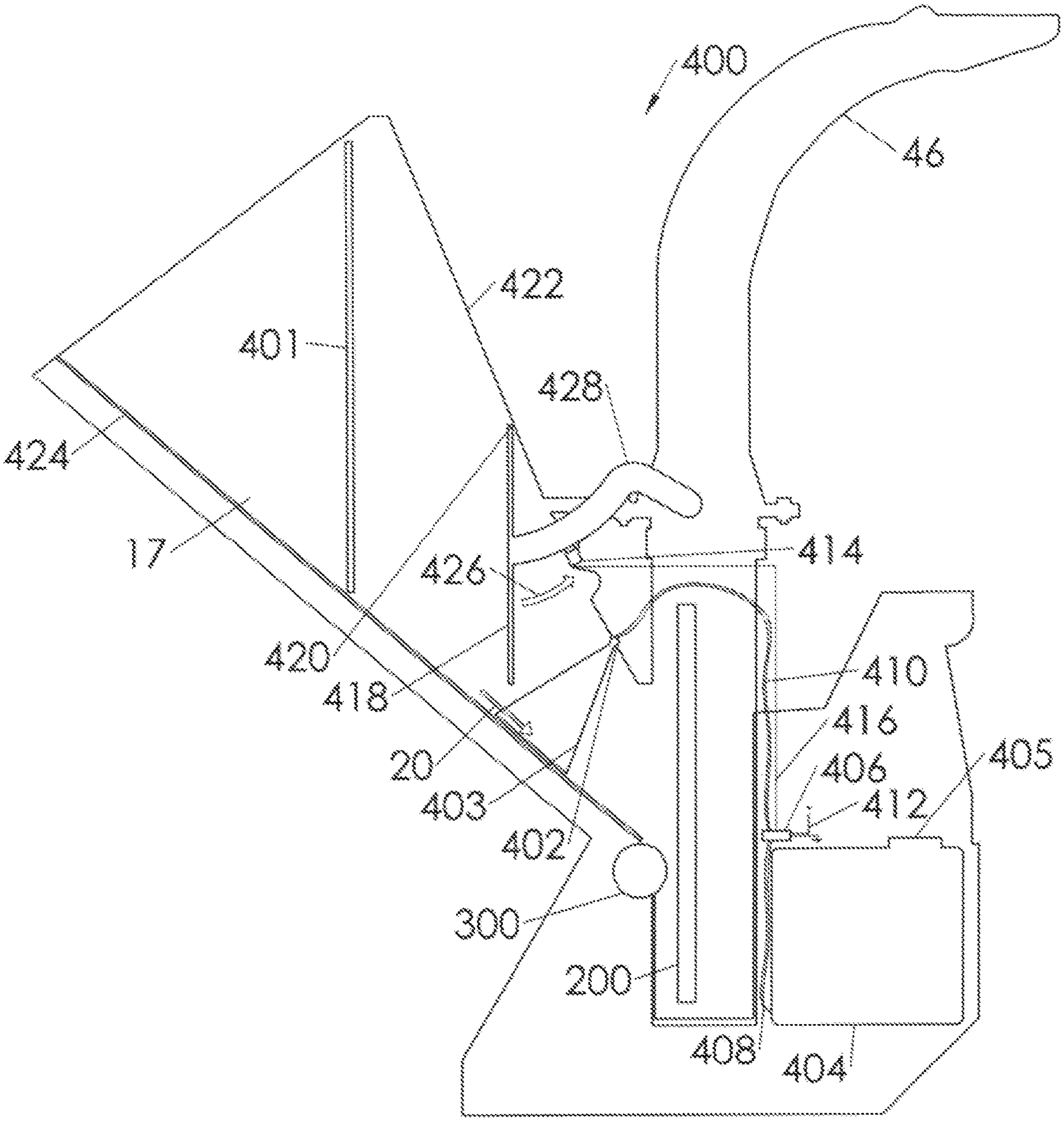
FIG. 10 is a schematic view of another embodiment of the wood chipper containing the roller anvil and a mechanism for providing spray mist to wood product being fed down the in-feed bin.

Referring to FIG. 10, in order to make the knives last longer and to make the gravity feed easier (particularly when the roller anvil 300 is being used and an in-feed roller is not being used), there is provided a wood chipper 400 having a spray nozzle, illustrated at 402, for providing a mist of water onto the wood product to wet it as it is being gravity fed, as illustrated at 20, along the in-feed bin 17 and over the roller anvil 300 and into contact with the laminated flywheel 200 having the skewed knives. The water spray pattern, whose purpose is to provide improved chipping as well as blade cooling and lubrication, is illustrated at 403. It should be understood that the water spray may be used with any other suitable flywheel or wood product feed system (gravity and/or in-feed roller or rollers). A protective shield 401 is desirably provided to protect the operator from chips blowing back.

Water for the water spray is contained in water tank 404 having a filling cap 405. A 12-volt water pump 406 (or other suitable water pump) receives water through line or hose 408 and discharges the water through line or hose 410 to the spray nozzle 402. The pump 406 is powered by a suitable 12-volt power source 412 such as from a tractor to which the wood chipper is connected (or other suitable power source). Upon the closing of a suitable switch 414, operation of the water pump 406 is initiated via line 416 to provide the water mist from the spray nozzle 402, and upon opening of the switch 414, the pump 406 is turned off to cease the spray of the water mist.

A rigid baffle 418, made of vinyl or other suitable material, is suitably hingedly attached at 420 to a downwardly-extending upper wall 422 of the in-feed bin 17 and hangs therefrom to extend downwardly to terminate short of the downwardly-extending bottom wall 424 of the in-feed bin along which the wood product is gravity fed. When wood product is fed down the in-feed bin, it impinges and thereby effects pivoting movement of the baffle 418 about a hinge, schematically illustrated as or at hinge point 420, in the direction as illustrated at 426, as the wood product pushes against and passes under and by the resultingly raised bottom of the baffle 418. A suitable plate 428 (switch actuator plate) is connected to the baffle 418 and positioned in a manner to turn the switch 414 on as the baffle 418 is moved in direction 426 so as to thereby effect pumping of water through line 410 to provide the spray mist to the wood product being fed down the in-feed bin 17 and to turn the switch off thereby stopping the pumping of water when the baffle 418 is returned to its position shown in FIG. 10 when there is no more wood product passing down the in-feed bin 17 and the spray mist is thus no longer needed. Thus, water is desirably conserved when wood product is not being chipped. The actuator 428 may also be suitably shaped, such as illustrated, to serve as a handle for manipulation as needed. The products for building the water spray system may be selected from conventional products by those of ordinary skill in the art to which the present invention pertains.

It should be understood that, while the present invention has been described in detail herein, the invention can be embodied otherwise without departing from the principles thereof, and such other embodiments are meant to come within the scope of the present invention as defined by the appended claims.

What is claimed is:

1. A flywheel for a wood chipper, the flywheel having a thickness and comprising a plurality of plates each having a plurality of apertures, wherein said plurality of plates are laminated together with fasteners received in respective ones of said apertures in said plurality of plates respectively, a central opening in each of said plates for receiving a shaft in said central openings of said plates for effecting rotation of the flywheel, at least one knife attached to the laminated plates for cutting wood material to form chips of the wood material as the flywheel is rotated, and a cylindrical member configured to interact with the at least one knife such that a leading piece of the wood material and a trailing piece of the wood material remain attached to each other to cause the leading piece of the wood material to pull the trailing piece of the wood material into the flywheel during cutting of the wood material, wherein said plates, including said apertures and said central openings, are each formed by laser cutting, wherein a combined thickness of said plurality of plates laminated together is equal to said thickness of the flywheel, and wherein each of said plates is of a type having a thickness of up to about ⅜ inch and composed of steel.

2. The flywheel according to claim 1 wherein each of said plates is composed of carbon steel.

3. The flywheel according to claim 1 wherein each of said plates has the thickness of about ⅜ inch.

4. The flywheel according to claim 1, wherein each of said apertures and each of said central openings has a diameter which is equal to at least the thickness of said respective plate.

5. A wood chipper comprising a flywheel having a thickness and including a plurality of plates each having a plurality of apertures, wherein said plurality of plates are laminated together with fasteners received in respective ones of said apertures in said plurality of plates respectively, a central opening in each of said plates for receiving a shaft in said central openings of said plates for effecting rotation of said flywheel, at least one knife attached to the laminated plates for cutting wood material to form chips of the wood material as said flywheel is rotated, and a cylindrical member configured to interact with the at least one knife such that a leading piece of the wood material and a trailing piece of the wood material remain attached to each other to cause the leading piece of the wood material to pull the trailing piece of the wood material into the flywheel during cutting of the wood material, wherein said plates, including said apertures and said central openings, are each formed by laser cutting, wherein a combined thickness of said plurality of plates laminated together is equal to said thickness of said flywheel, and wherein each of said plates is of a type having a thickness of up to about ⅜ inch and composed of steel.

6. The wood chipper according to claim 5 wherein each of said plates is composed of carbon steel.

7. The wood chipper according to claim 5 wherein each of said plates has the thickness of about ⅜ inch.

8. The wood chipper according to claim 5, wherein each of said apertures and each of said central openings has a diameter which is equal to at least the thickness of said respective plate.

9. A process for making a flywheel for a wood chipper comprising the steps of:

laser cutting a plurality of plates, including laser cutting a plurality of apertures in each of the plates and laser cutting a central opening in each of the plates for receiving a shaft for effecting rotation of the flywheel;

laminating the plurality of plates together by inserting fasteners in corresponding ones of the apertures in the plates;

attaching at least one knife to the laminated plates for cutting wood material to form chips of the wood material as the flywheel is rotated whereby the flywheel is made, wherein each of said plates is of a type having a thickness of up to about ⅜ inch and composed of steel; and associating a cylindrical member with the at least one knife, wherein the cylindrical member is configured to interact with the at least one knife such that a leading piece of the wood material and a trailing piece of the wood material remain attached to each other to cause the leading piece of the wood material to pull the trailing piece of the wood material into the flywheel during cutting of the wood material.

10. The process according to claim 9 wherein each of the plates is composed of carbon steel.

11. The process according to claim 9 wherein each of the plates is laser cut to have the thickness of about 3/8 inch.

12. The process according to claim 9 wherein the step of laser cutting a plurality of apertures comprises laser cutting the plurality of apertures to each have a diameter equal to at least the thickness of said respective plate, and wherein the step of laser cutting a central opening comprises laser cutting the central opening to have a diameter equal to at least the thickness of said respective plate.

* * * * *